United States Patent [19]

Bäuml et al.

[11] Patent Number: 4,624,218
[45] Date of Patent: Nov. 25, 1986

[54] HEATER, PARTICULARLY AN AUXILIARY VEHICLE HEATER

[75] Inventors: Wolfgang Bäuml, Eichenau; Ernst Mosig, Iffeldorf, both of Fed. Rep. of Germany

[73] Assignee: Webasto-Werk W. Baier GmbH & Co., Fed. Rep. of Germany

[21] Appl. No.: 731,493

[22] Filed: May 7, 1985

[30] Foreign Application Priority Data

May 8, 1984 [DE] Fed. Rep. of Germany ....... 3416878

[51] Int. Cl.$^4$ .............................................. F22B 7/00
[52] U.S. Cl. .............................. 122/136 R; 122/367 C; 122/136 C; 126/350 R
[58] Field of Search ........... 122/367 C, 367 A, 135 F, 122/136 C, 136 R; 126/350 R

[56] References Cited

U.S. PATENT DOCUMENTS

| 3,612,001 | 10/1971 | Gossalter | 122/136 R |
|---|---|---|---|
| 3,734,066 | 5/1973 | Scheyen | 122/136 C |
| 4,157,698 | 6/1979 | Viessmann | 122/136 R |
| 4,169,431 | 10/1979 | Viessmann | 122/136 R |
| 4,192,259 | 3/1980 | Viessmann | 122/136 C |
| 4,282,833 | 8/1981 | Giesen | 122/367 C |
| 4,299,194 | 11/1981 | Miller | 122/136 R |
| 4,327,672 | 5/1982 | Viessmann | 122/136 C |
| 4,366,778 | 1/1983 | Charrier et al. | 122/367 C |
| 4,453,498 | 6/1984 | Juhasz | 122/136 C |
| 4,488,514 | 12/1984 | de Poray et al. | 122/136 R |
| 4,543,943 | 10/1985 | Gruber et al. | 122/367 C |

Primary Examiner—Henry C. Yuen
Attorney, Agent, or Firm—Sixbey, Friedman & Leedom

[57] ABSTRACT

A vehicle auxiliary heating device of the type which has a burner aggregate, a burner pipe forming a combustion chamber and a heat transfer arrangement that contains an inner jacket with ribs and an outer jacket is improved by having the outer jacket and the inner jacket provided with ribs formed of a one-piece extruded profile part. On the ends of the inner and outer jackets facing away from the burner aggregate, lid parts are attached which, preferably, are welded on and effectively are formed by aluminum sheet parts and/or cast parts. Furthermore, the end of the extruded profile part facing the burner aggregate may be shaped to directly provide a receiving flange for the burner aggregate or a closure ring part may be fastened, preferably by welding, at this end of the extruded profile part, for the attachment of the burner aggregate.

18 Claims, 3 Drawing Figures

HEATER, PARTICULARLY AN AUXILIARY VEHICLE HEATER

BACKGROUND AND SUMMARY OF THE INVENTION

The invention relates to a heating device, especially an auxiliary heating device for vehicles. The invention deals in particular with a water heating device in which water is used as a liquid heat transferring medium in the heat exchanger of the heating device.

From the German Offenlegungsschrift No. 32 08 828 and corresponding U.S. Pat. No. 4,543,943, a heating device operated with a liquid fuel, especially a heating device for vehicles using a liquid heat transfer medium has been known. Such a heating device has a burner aggregate which partially projects into a combustion chamber formed by a combustion pipe. The combustion chamber is surrounded concentrically by a heat exchanger arrangement that has an inside jacket provided with ribs and an outside jacket. Combustion gases flow through the annular chamber between the inside jacket and the burner pipe, and a liquid heat transfer medium, such as water, flows through the annular chamber between the outside jacket and the inside jacket. Generally, such water heating devices are made from parts of sheet steel which are connected together, for example, by welding.

Furthermore, recent heating devices of this construction, that is to say water heating devices, have been produced from light metal cast parts, such as cast aluminum parts. In this case, the outside jacket is developed as a separate cast part and the inside jacket is formed with the ribs as an additional, separate cast part. On the outside surface of the cast part forming the inside jacket, i.e., on the surface which limits the annular space between the outside jacket and the inside jacket, baffle plates running in a spiral shape are provided for the guidance of the liquid heat transfer medium, such as water. These spiral-shaped baffle plates forces a bipartite development of the inside jacket and the outside jacket in the case of such water heating devices. Furthermore, in the development of cast parts, it is necessary to consider oblique shapes and oversize for machining, as a result of which the shaping of the cast parts is limited. Also the tools and the molds for the cast parts are expensive which is reflected in the production costs for the cast parts. Furthermore, the casting structure is not sufficiently tight so that the cast part forming the water jacket has to be treated secondarily in order to close the pores of the casting structure. On the basis of the multipart development of the heat exchanger arrangement in the case of the known heating devices, many steps are required in the production. Also, difficulties are associated in maintaining a pressure- and watertight connection of the cast parts, since seals are provided at the points of connection that tend to leak after a while.

From the German Pat. No. 24 32 850, a heating device for vehicles has been known. In this case, however, a so-called air heating device, in which air is used as a heat transfer medium, is described. In order to decrease the dead weight of the heating device as well as for the purpose of enabling it to be produced simply and cheaply, in the case of this air heating device, the outside pipe and the inside pipe of the heat transfer arrangement together with the surrounding wall of the receiving chamber consist of a single cast part. Preferably, the casting is a light metal casting, therefore a so-called diecast part.

From the German Pat. No. 24 53 202, another form of an air heating device has been known in the case of which the inside jacket with its ribs and the wall of a receiving chamber for an electromotor that is disposed coaxially with respect to the combustion chamber, are formed by a single cast part on which the outside jacket, developed as a cast part, is molded on. The outside jacket is connected with the inside jacket only by individual ribs on the ends of the heat transfer arrangement. In the case of the use of light metal diecast parts for water heating devices, the previously cited difficulties occur with regard to the need for a secondary treatment and the tightness of the cast structure.

From the German Pat. Nos. 11 24 839 and 10 05 860 and German Utility Model No. 17 82 914, heating arrangements for motor vehicles have been known which operate and are developed as waste gas heat exchangers, and to develop parts of the heat exchanger in one piece as a diecast part, for example, the outside pipe with molded on radially running ribs and heat conductors projecting into the heating air channel. Such a diecast part is diecast from aluminum or an aluminum alloy as a straight line extruded profile. To form an outside jacket, the heat transfer arrangement has been surrounded by a steel sheet part. In this case, however, the problem exists that such extruded profile parts may lead to an overheating of the jacket so that the extruded profile part becomes too hot. In the case of water heating devices, generally sealing problems are a concern when connecting steel sheet parts and extruded profile parts, since these parts consist of different materials having different heat exchange coefficients, and the corrosion resistance is impaired. Hitherto, all these considerations have led to the fact that, in the case of the production of water heating devices, only light metal cast parts have been used which may be shaped such that the places of connection are disposed, not in the hottest area of the heat transfer arrangement, but as close as possible to the colder area of it, in order to make possible a reliable sealing of the connecting places.

Therefore, a primary object of the invention is to create a water heating device that overcomes the previously described difficulties and prejudices existent in the prior art, and, especially, provides the necessary water tightness, while being simple to produce at a reasonable cost as well as composed of as few as possible individual parts. Furthermore, such a water heating device should take up as little installation space as possible, should guarantee an efficient heat transfer and should have a dead weight that is as low as possible.

According to the invention, a heating device, especially an auxiliary vehicle heating device which may be operated with a liquid heat transfer medium, such as water, has a heat exchanger with an outer jacket formed as a single extruded profile part with ribbed inner jacket thereof.

Since, in the case of the heating device according to the invention, the outer jacket and the inner jacket provided with ribs are formed simultaneously in one operating step, according to the extrusion method, as a one-piece extruded profile part, the number of component parts which are to be put together is reduced in the case of such a water heating device. Especially in this case, separable connecting places may be avoided which hitherto lead to sealing problems in the case of water heating devices.

Also, according to the extrusion method, the shaping of the parts may be selected in a less restricted manner than in the case of cast parts, since oblique shapes and oversize for machining need not be taken into consideration. As a result, the extruded profile may be produced very thin and with even thicknesses of the wall in one operating step. Not only a material saving, but also a considerable saving in weight results, besides a surprisingly simplified production as compared to cast parts. Furthermore, the development as an extruded profile part makes possible that, in comparison to cast parts, a larger number of ribs and thinner ribs may be provided, thereby improving the degree of effectiveness of the heat transfer arrangement due to an increase of the convective heat transfer portion. As a result of the increased effectiveness, it will also be possible to shorten the length of the heat transfer arrangement and, thus of the entire heating device. Still further, additional steps of treatment for guaranteeing the tightness of the parts are omitted, since the structure of the extruded profile part is relatively tight, contrary to the structure of cast parts. Additionally, extruded profile parts may be anodized without difficulties, so that it is possible to improve the corrosion protection in a simple manner. Finally, the tools for such an extruded profile part are considerably cheaper than the molds and tools for corresponding cast parts. Also certain extrusion alloys are resistant to corrosion by the combustion gases flowing in the annular space between the burner pipe and the inside jacket.

For closing the ends of the annular chambers on the end facing away from the burner aggregate, lid parts are provided. These lid parts, which preferably are formed from deep drawn aluminum sheet parts, are welded directly onto the ends of the extruded profile part. Since, in this case, a continuous bordering exists and the place of the welded seam is easily accessible, these lid parts may be welded on without difficulty in such a way that the welded connection is reliably tight. Whenever, the lid parts are formed by deep drawn aluminum sheet parts, then the materials for the extruded profile part, aluminum or an aluminum alloy, and the lid parts to be connected should have similar characteristics, especially with regard to heat conduction and heat expansion, so that additional loads on the welds may be avoided.

With regard to the attachment of the burner aggregate to the ends of the inner and outer jackets facing the burner aggregate, the burner aggregate is provided with a flange part that will be secured to a closing ring that is attached to these ends, preferably by means of welding. In order to guarantee a reliable and tight connection, the closure ring is partially inserted into the space between the inner and the outer jackets and is provided with a welded seams between it and both the inner jacket and the outer jacket of the extruded profile part.

Preferably, the lid parts as well as the closure ring are attached by the manufacturer of the extruded profile part, so that the extruded profile part may be delivered with the lid parts and the closure ring in a condition ready for testing for tightness by the heater manufacturer.

In the case of the one-piece extruded profile part, the outer and the inner jackets are connected by way of axially running bridges. As a result, parallel water channels are formed in the annular space, between which the liquid heat transfer medium flows, without, however, having any significant influence on heat transfer, bubble formation or flow resistance.

According to a modified embodiment, the end of the extruded profile part facing the burner aggregate is developed in such a way that it serves directly for receiving the burner aggregate. Owing to this development, the use of a closure ring welded to the extruded profile part may be omitted, so that the number of parts on the heating device may be reduced still further, because the burner aggregate may be mounted onto the molded-on receiving flange of the extruded profile part directly. For the attachment of the burner aggregate by screws, preferably, through-holes are developed on the extruded profile part.

It is also possible to adapt the outside contour of the extruded profile part to the shape of the burner aggregate and of an optionally provided cover-up hood by, for example, selecting a cross section for the extruded profile part approaching a square. As a result, the production of such a device is simplified and made cheapter since, for example, the processing and welding on of an intermediate flange to the burner head and/or at the end of the extruded profile part is omitted. Also, the inlet and outlet connection for the liquid heat transfer medium may be disposed in such a way that they are formed integrally, for example, as a part of the lid so that it will not be necessary to weld these inlet and outlet connections to the extruded profile part in a separate operating step.

In addition, strips are formed in the extruded profile part for the attachment of a cable cover-up hood and/or bases serving as supports on the extruded profile part, so that no separate attachment for a support will be necessary. Naturally, it will also be possible to mold additional means of attachment onto the extruded profile part or possibly to develop cable channels, all of which are integrated into it in a single operating step with the production of the extruded profile part in order to shorten the production and mounting time.

In order to reduce the dead weight of the heating device as far as possible, and in order to increase the transfer of heat, a light metal or a light metal alloy, preferably an aluminum or an aluminum alloy, is used for the production of the extruded profile part. Furthermore, this material is easily anodizable in order to improve the corrosion resistance of the extruded profile part.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
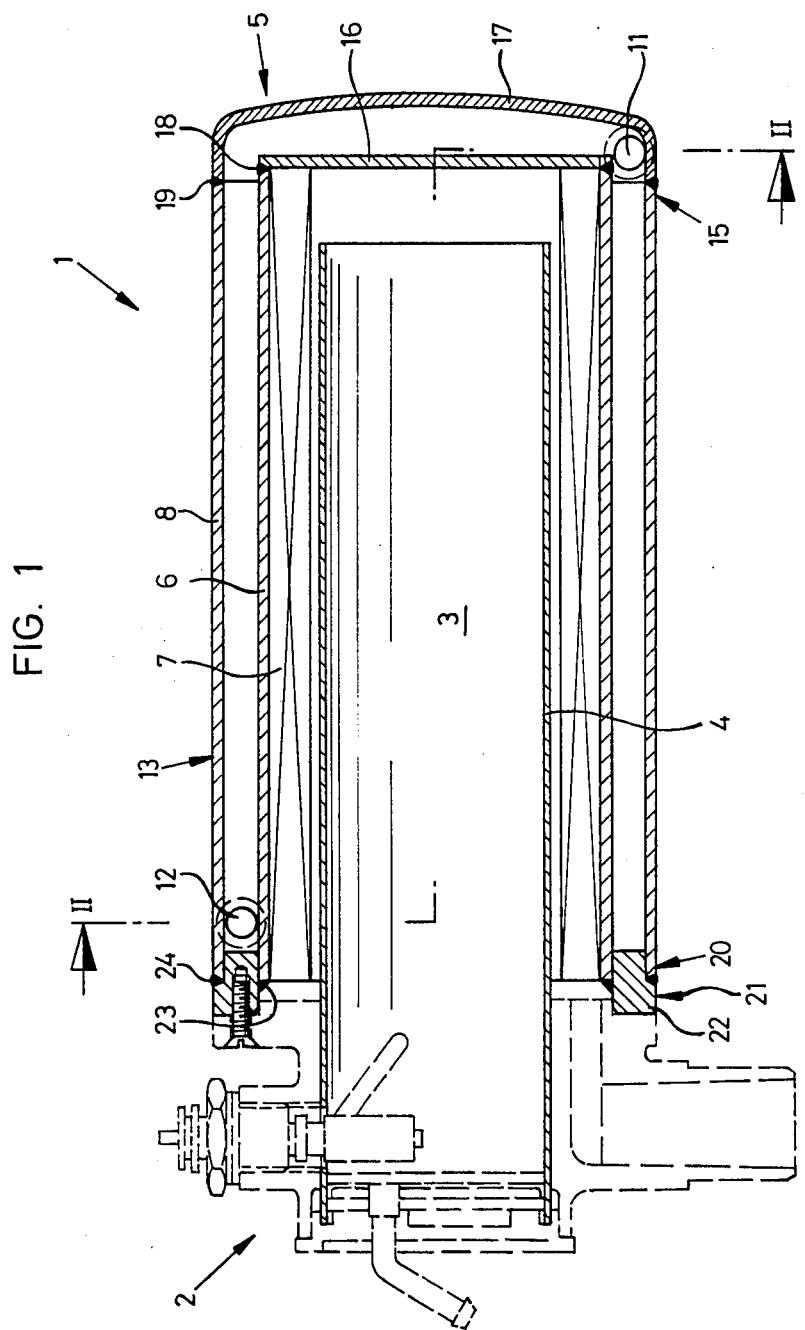
FIG. 1 shows a longitudinal sectional view of a water heating device.
Figure 2:
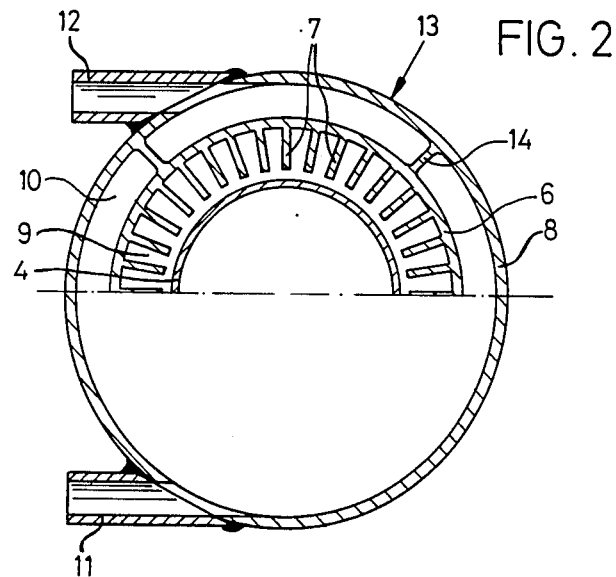
FIG. 2 shows a cross-sectional view along the line II—II in FIG. 1.

In the FIGS. 1 and 2, a vehicle auxiliary heating device, a so-called water heating device, is shown as an example of a heating device. This vehicle auxiliary heating device has been designated generally by reference numeral 1. The vehicle auxiliary heating device 1 has a burner aggregate 2 which is shown only schematically and by way of example. Various types of construction, as are known per se, may be used as burner aggregate 2. The burner aggregate 2 projects into a combustion chamber 3 which is formed by a burner pipe 4. The burner pipe 4 is surrounded concentrically by a heat exchanger arrangement designated, as a whole, by 5. The heat exchanger arrangement 5 has an inner jacket 6, which is provided with radially running ribs 7 (see FIG. 2), and it has an outer jacket 8. Between the inner jacket 6 and the burner pipe 4, an annular space 9 is formed and between the inner jacket 6 and the outer jacket 8 an annular space 10 is formed.

At the end of the combustion chamber 3 facing away from the burner aggregate 2, the combustion gases reverse their direction of flow and flow through the annular chamber 9 between the inner jacket 6 and the combustion pipe 4, thereafter to emerge by way of a gas outlet, not shown in the drawing. In either counterflow or parallel flow, a liquid heat transfer medium, preferably water, flows in the annular space 10, between the inside jacket 6 and the outside jacket 8, in heat exchange relationship with the combustion gases flowing in the annular space 9, via inner jacket 6. The water in the annular space 10, serving as a heat transfer medium, is introduced by way of an inlet connection 11 and exits by way of an outlet connection 12 or vice versa. The water heated in this way is then used for heating purposes, especially for warming the motor block of the vehicle and the interior space of the vehicle.

According to FIG. 1, the inner jacket 6 and the outer jacket 8 are formed by a one-piece extruded profile part, which is referenced generally by numeral 13. As one can see, especially, from FIG. 2 in connection with FIG. 1, this extruded profile part 13 (which is produced in a single step) not only has the inner jacket 6 and the outer jacket 8, but also the ribs 7 of the inner jacket 6 and bridges 14 that run in an axial direction so as to circumferentially subdivide the annular space 10 into parallel channels lying side by side, through which channels water flows as a heat transfer medium.

Since the outer jacket 8 and the inner jacket 6 formed with the radially extending longitudinal ribs 7 are formed by a one-piece extruded profile part 13, the production of such a heating device 1 is simplified considerably, and especially the extruded profile part 13 are pressure and watertight, contrary to the case if these pieces of the structure were castings. Therefore, no further secondary treatments of the extruded profile part 13 are needed.

As shown in FIG. 1, at the ends 15 of the extruded profile part 13 facing away from the burner aggregate 2, cover parts 16 and 17 are attached. The lid part 16 is connected to the end 15 of the inner jacket 6 of the extruded profile part 13 by means of an annular weld seam 18 of V-shaped cross section. The lid part 17 is, likewise, attached to the end of the outer jacket 8 by means of an annular seam 19 of V-shaped cross section. Lid part 17 has a dome-shape that appears arched in the cross-sectional view of FIG. 1.

The lid part 16 for the inner jacket 6 consists, preferably, of aluminum sheet and the lid part 17 at the outside jacket 8 consists preferably of a deep drawn aluminum sheet or of plastic, but may be a sand cast part. These lid parts 16, 17 may be attached safely and reliably, as well as in a leakproof manner, to the ends 15 of the extruded profile part 13 by means of welding or screws. As a result, the production, finishing and mounting of the heat transfer arrangement 5 of such a vehicle auxiliary heating device 1 is simplified.

At the end 20 of the extruded profile part 13 which faces the burner aggregate 2, a closure ring 21 has been attached, in the case of the illustrated embodiment by welding. This closure ring 21 serves for the attachment of the burner aggregate to profile parts 13. As shown in FIG. 1, the closure ring 22 is partially inserted into the annular chamber 10 between the inner jacket 6 and the outer jacket 8 and two welding seams 23 and 24 are provided. The weld seam 23 attaches the closure ring 21 to the inner jacket 6 and weld seam 24 attaches the flange part of the closure ring 21 to the outer jacket 8 of the extruded profile part 13. These weld seams 23 and 24 may be formed to be reliably pressure proof and waterproof, without there being any need for seals or special developments of the parts to be connected. The burner aggregate 2 may then be attached at a flange 22 thereof to the closure ring 21, such as by screws, only one of which is illustrated. As can be seen, furthermore, from FIG. 2, an inlet connection 11 and an outlet connection 12 may be welded onto the outside jacket 8 of the extruded profile part 13.

Figure 3:
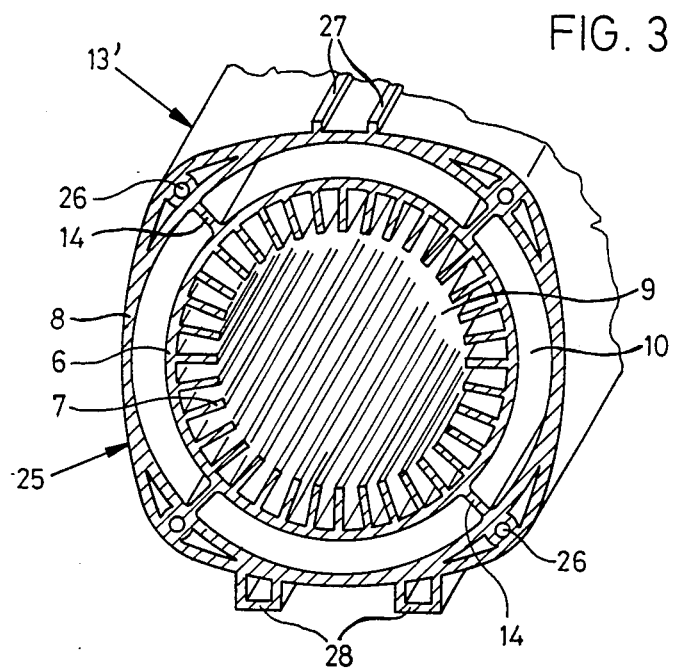
FIG. 3 shows a perspective view of a modified embodiment of an extruded profile part for the outer and inner jackets of a heating device.

In FIG. 3, a modified extruded profile part is shown and designated generally by reference numeral 13'. In this case, parts which correspond to parts of the previously described embodiment have as been given the same reference numerals. Just as in the case of the preceding embodiment, the extruded profile part 13 comprises an outer jacket 8 and an inner jacket 6 on which radially extending longitudinal ribs 7 are formed. The outer jacket 8 and the inner jacket 6 of FIG. 3 are also connected with one another by way of bridges 14 whch run in an axial direction. The end shown in FIG. 3 is the end 20 of the extruded profile part 13' facing the burner aggregate 2. This end has receiving flanges 25 integrated into the case of the extruded profile part 13' for attachment of the burner aggregate 2. Also, the contour of the receiving flanges 25 is adapted to the contour of the burner aggregate, so that a smooth transition from the burner aggregate 2 to the remaining part of the heating device 1 of the vehicle exists. The contour of the extruded profile part 13', shown in FIG. 3, approximates a square with rounded sides. Furthermore, in the part of the extruded profile part 13' developed as receiving flanges 25, through-holes 26 are formed into which attachment means for the fastening of an outside cover and/or of the burner aggregate 2 may be introduced.

As is apparent from FIG. 3, strips 27 (for the attachment of a cable covering hood, not shown) and strips 28 (which form leg ridges that support the heating device 1 and bring about an increased safety of position) are formed as part of the extruded profile. The strips 28 have a hollow profiled cross section so that, for example, cables or the like may also be conducted through these parts.

Naturally, it will be possible to have additional parts formed as part of the extruded profile part 13 or 13' without difficulty, since the production of an extruded profile part 13, 13' with regard to shaping, in contrast to cast pieces, is not subject to any kind of limitations.

As is apparent from the preceding explanations, the production of an auxiliary heating device 1 for a vehicle may be considerably simplified by the development of the inner jacket 6 and the outer jacket 8 in the form of a one-piece extruded profile part 13, 13' that has a pressure- and watertight structure. As a result of this development of the extruded profile part 13, 13', the connecting and sealing problems occurring hitherto, in the case of multipart heat exchanger arrangements, may be reduced in the case of the use of water as a heat transferring medium. Since in the case of such an extruded profile part 13, 13', one need not take into consideration any oblique shapes and oversize for machining such as is the case with castings, the extruded profile parts 13, 13' may be developed in a cost-favorable manner with thin and even wall thicknesses, and it will be possible to develop as many thin ribs 7 on the inner jacket 6 in order to improve the degree of effectiveness of the heat transfer arrangement 5 by an additional use of the convective heat transfer. Therefore, a relatively short overall length of the vehicle auxiliary heating device 1 may be used due to the relatively high degree of effectiveness of it.

While we have shown and described various embodiments in accordance with the present invention, it is understood that the same is not limited thereto, but is susceptible of numerous changes and modification as known to those skilled in the art, and we, therefore, do not wish to be limited to the details shown and described herein, but intend to cover all such changes and modifications as are encompassed by the scope of the appended claims.

We claim:

1. In a heating device, especially an auxiliary vehicle heating device of the type having a burner aggregate, a combustion chamber formed by a burner pipe and a heat transfer arrangement concentrically surrounding the combustion chamber, which heat transfer arrangement has an inner jacket provided with ribs and an outer jacket, an annular space being formed between the inner jacket and the burner pipe and communicating with said combustion chamber for enabling combustion gases produced in the combustion chamber to flow therethrough, and another annular space being formed between the outer jacket and the inner jacket through which a liquid heat transfer medium flows, the improvement wherein the outer jacket and the inner jacket provided with ribs are formed of a one-piece extruded profile part, and wherein the inner jacket is connected to the outer jacket by way of axially running bridges of the one-piece extruded profile part that subdivides the annular space between the inside and outer jackets in a circumferential direction.

2. Heating device as in claim 1, wherein a respective lid part is attached on ends of the inner and outer jackets facing away from the burner aggregate.

3. Heating device as in claim 2, wherein at least one lid part is a cast part.

4. Heating device as in claim 2, wherein at least one lid part is a deep drawn aluminum sheet.

5. Heating device as in claim 4, wherein an end of the one-piece extruded profile part facing the burner aggregate is formed with receiving flanges for the burner aggregate.

6. Heating device according to claim 5, wherein the receiving flanges are provided with a through-hole by which fastening means for the burner aggregate are attached.

7. Heating device as in claim 2, wherein a closure ring is attached in the area of ends of the inner and outer jackets facing the burner aggregate.

8. Heating device as in claim 7, wherein the closure ring is partially inserted in the annular space between the inner and outer jacket and is welded to the inner and outer jacket.

9. Heating device as in claim 2, wherein an end of the one-piece extruded profile part facing the burner aggregate is formed with receiving flanges for the burner aggregate.

10. Heating device as in claim 1, wherein an end of the one-piece extruded profile part facing the burner aggregate is formed with receiving flanges for the burner aggregate.

11. Heating device according to claim 10, wherein the receiving flanges are provided with a through-hole by which fastening means for the burner aggregate are attached.

12. Heating device according to claim 11, wherein the receiving flanges are provided with a through-hole by which fastening means for the burner aggregate are attached.

13. Heating device as in claim 1, wherein at least one of strips for the attachment of a cable cover hood and support leg strips are formed as part of the one-piece extruded profile part.

14. Heating device as in claim 13, wherein the light metal is aluminum and the light metal alloy is an aluminum alloy.

15. Heating device as in claim 13, wherein at least one of strips for the attachment of a cable cover hood and support leg strips are formed as part of the one-piece extruded profile part.

16. Heating device as in claim 1, wherein the extruded profile part is produced of a material from the group consisting of a light metal and a light metal alloy.

17. Heating device as in claim 1, wherein a closure ring is attached in the area of ends of the inner and outer jackets facing the burner aggregate.

18. Heating device as in claim 1, wherein the closure ring is partially inserted in the annular space between the inner and outer jacket and is welded to the inner and outer jackets.

* * * * *